United States Patent
Berlingerio et al.

(10) Patent No.: US 10,760,916 B2
(45) Date of Patent: Sep. 1, 2020

(54) METHODS AND SYSTEMS FOR DETERMINING SHARED ROUTES

(71) Applicant: INTERNATIONAL BUSINESS MACHINES CORPORATION, Armonk, NY (US)

(72) Inventors: Michele Berlingerio, Noicattaro (IT); Adi I. Botea, Dublin (IE); Radu Marinescu, Castleknock (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 212 days.

(21) Appl. No.: 15/616,041

(22) Filed: Jun. 7, 2017

(65) Prior Publication Data
US 2018/0356238 A1    Dec. 13, 2018

(51) Int. Cl.
*G01C 21/34* (2006.01)
*G01C 21/36* (2006.01)
*H04W 4/02* (2018.01)
*G01C 21/20* (2006.01)

(52) U.S. Cl.
CPC ......... *G01C 21/3438* (2013.01); *G01C 21/20* (2013.01); *G01C 21/362* (2013.01); *H04W 4/025* (2013.01)

(58) Field of Classification Search
CPC .. G01C 21/3438; G01C 21/362; H04W 4/025
See application file for complete search history.

(56) References Cited

U.S. PATENT DOCUMENTS

| 8,660,789 B2 | 2/2014 | Demiryurek et al. |
| 2004/0220965 A1 | 11/2004 | Harville et al. |
| 2014/0111358 A1* | 4/2014 | Gontmakher .......... G08G 1/127 340/994 |
| 2017/0284807 A1* | 10/2017 | Saito ...................... B63B 49/00 |
| 2017/0293296 A1* | 10/2017 | Stenneth ............ G01C 21/3438 |

OTHER PUBLICATIONS

Mitra et al., "Variable ordering for shared binary decision diagrams targeting node count and path length optimization using particle swarm technique," IET Computers & Digital Techniques, vol. 6, Issue 6, Nov. 2012 (9 pages).

(Continued)

*Primary Examiner* — Genna M Mott
(74) *Attorney, Agent, or Firm* — Griffiths & Seaton PLLC

(57) ABSTRACT

Embodiments for determining routes by one or more processors are described. A first set of route parameters is received. A second set of route parameters is received. At least one of the first set of route parameters and the second set of route parameters includes a route sharing parameter. A first route and a second route are determined based on the first set of route parameters and the second set of route parameters. The first route includes a first shared portion, and the second route comprises a second shared portion. The first shared portion of the first route is within a predetermined distance of the second shared portion of the second route based on the route sharing parameter.

12 Claims, 8 Drawing Sheets

(56) References Cited

OTHER PUBLICATIONS

Anonymous, "System and Method for Group Optimal Common Meeting Place Recommender using Individualized Spatio-Temporal Presence Information," an IP.com Prior Art Database Technical Disclosure, IP.com No. IPCOM000220496D, Aug. 2, 2012 (5 pages).

Anonymous, "A System & Method for Predicting Future Spatial and Temporal Occurrence of Users based on their Past Spatio-Temporal Behavior," An IP.com Prior Art Database Technical Disclosure, IP.com No. IPCOM000245213D, Feb. 18, 2016 (5 pages).

Anonymous, "A System & Method for Determining Similarity between Spatio-Temporal Behavior of Users," An IP.com Prior Art Database Technical Disclosure, IP.com No. IPCOM000245212D, Feb. 18, 2016 (6 pages).

* cited by examiner

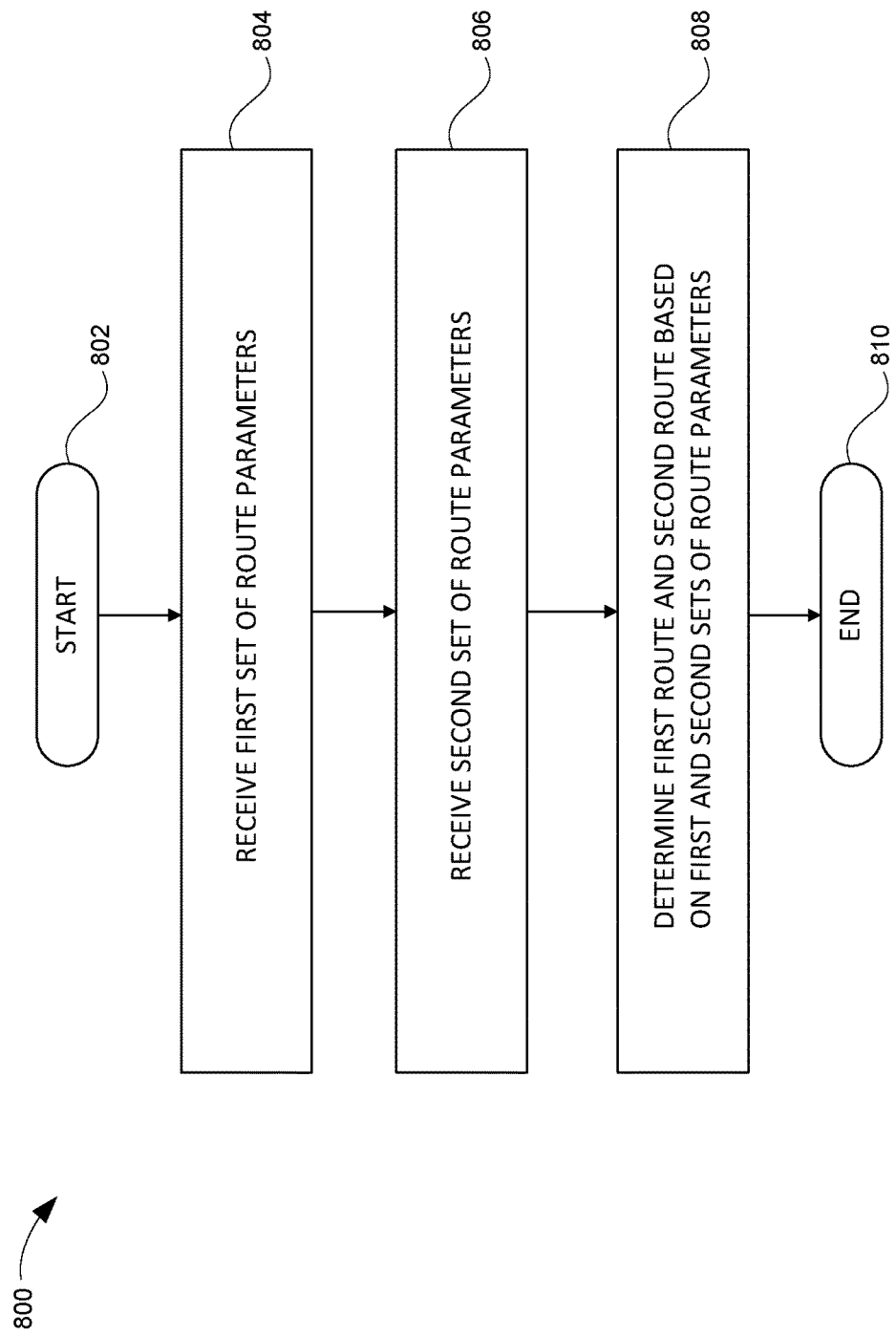

METHODS AND SYSTEMS FOR DETERMINING SHARED ROUTES

BACKGROUND OF THE INVENTION

Field of the Invention

The present invention relates in general to computing systems, and more particularly to, various embodiments for creating shared routes for various entities such as people, mobile devices, or vehicles.

Description of the Related Art

In some instances, it is desirable for multiple entities (e.g., people, mobile devices, vehicles, etc.) that are travelling to share routes, or at least be in close proximity of each other while travelling. As one example, consider runners, cyclists, and hikers who are attempting to achieve particular training goals. It is often considered beneficial for such athletes to train together as it, for example, provides mutual motivation and/or is more enjoyable (i.e., when compared to training alone). In such cases, the athletes may desire to share routes with other athletes for as long as possible, or for just particular distances, durations, etc. However, making such arrangements with other like-minded individuals may be difficult due to various factors such as schedules, addresses, etc.

As another example, consider vehicles (e.g., ships, aircraft, etc.) travelling relatively long distances (e.g., across oceans). Due to, for example, safety and/or security concerns, it may be beneficial for the vehicles to travel together, or at least within close proximity of each other, while making such trips.

SUMMARY OF THE INVENTION

Various embodiments for determining routes by one or more processors are described. In one embodiment, by way of example only, a method for determining routes, again by one or more processors, is provided. A first set of route parameters is received. A second set of route parameters is received. At least one of the first set of route parameters and the second set of route parameters includes a route sharing parameter. A first route and a second route are determined based on the first set of route parameters and the second set of route parameters. The first route includes a first shared portion, and the second route comprises a second shared portion. The first shared portion of the first route is within a predetermined distance of the second shared portion of the second route based on the route sharing parameter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 8 is a flowchart diagram depicting an exemplary method for determining routes in which various aspects of the present invention may be implemented.

DETAILED DESCRIPTION OF THE DRAWINGS

Figure 1:
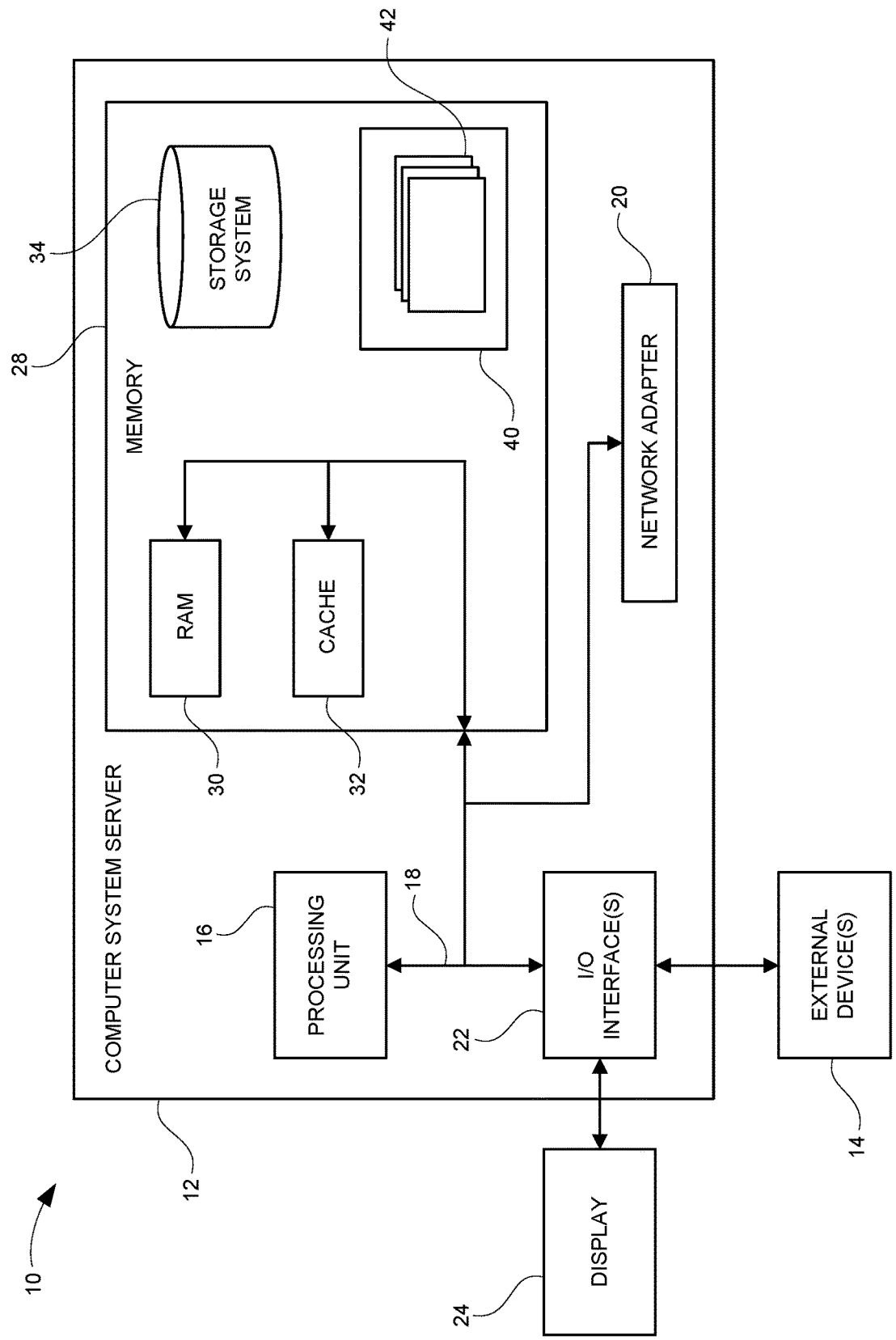
FIG. 1 is a block diagram depicting an exemplary computing node according to an embodiment of the present invention.

As previously indicated, in some instances, it may be desirable and/or beneficial for entities (e.g., people, mobile devices, vehicles, etc.) to share routes and/or remain within a certain proximity of each other while travelling. However, coordinating the movements of the entities in such a way that routes are desirably shared may be difficult. This may be particularly troublesome when each entity has particular route requirements or parameters (e.g., a "budget" with respect to total route distance, route time, a particular starting point, a particular destination, etc.).

To address these needs, the methods and systems of the present invention, for example, determine or create routes (or paths) for entities (e.g., people, mobile device, vehicles, etc.) in such a way that at least portions of the routes are "shared" (e.g., overlap or are in close proximity to each other) while still falling within route parameters associated with each of the entities.

For example, in some embodiments, a first set of route parameters, associated with a first entity, is received. A second set of route parameters, associated with a second entity, is received. At least one of the first set of route parameters and the second set of route parameters includes a route sharing parameter that describes that desired amount of sharing/overlap between the routes of the first and second entity. A first route and a second route are determined based on the first set of route parameters and the second set of route parameters. The first route includes a first shared portion, and the second route comprises a second shared portion. The first shared portion of the first route is within a predetermined distance of (e.g., overlaps) the second shared portion of the second route based on the route sharing parameter.

As a result, in at least some embodiments, the determined routes each have a portion that overlaps with (or is within a predetermined distance of) a portion of another one of the routes, while still complying with the other route parameters associated with that route (i.e., falling within the "budget" provided by the respective set of route parameters). This may allow each of the entities to travel with another entity during at least a portion of their respective route.

The route sharing parameters (i.e., the first set and/or the second set) may (also) include a starting point, a finishing point, a route distance, and route time. The starting point and the finishing point may correspond to the same location for at least one of the first route and the second route.

The route sharing parameter may include maximizing the length of the first shared portion of the first route and the second shared portion of the second route (e.g., maximizing the portions of the routes that overlap while still maintaining the other route parameters). As another example, the route sharing parameter may include a selected length of the first shared portion of the first route and the second shared portion of the second route (e.g., a set/desired length of the portions of the routes that overlap).

An indication of a meeting time associated with at least one of a first user associated with the first route and a second user associated with the second route may be generated. The generating of the indication may be performed using, for example, a mobile electronic device.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or enabling or causing) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, mobile devices such as mobile (or cellular and/or smart) phones, PDAs, tablets, wearable technology devices, laptops, handheld game consoles, portable media players, etc., as well as computing systems in vehicles, such as automobiles, aircraft, watercrafts, drones, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
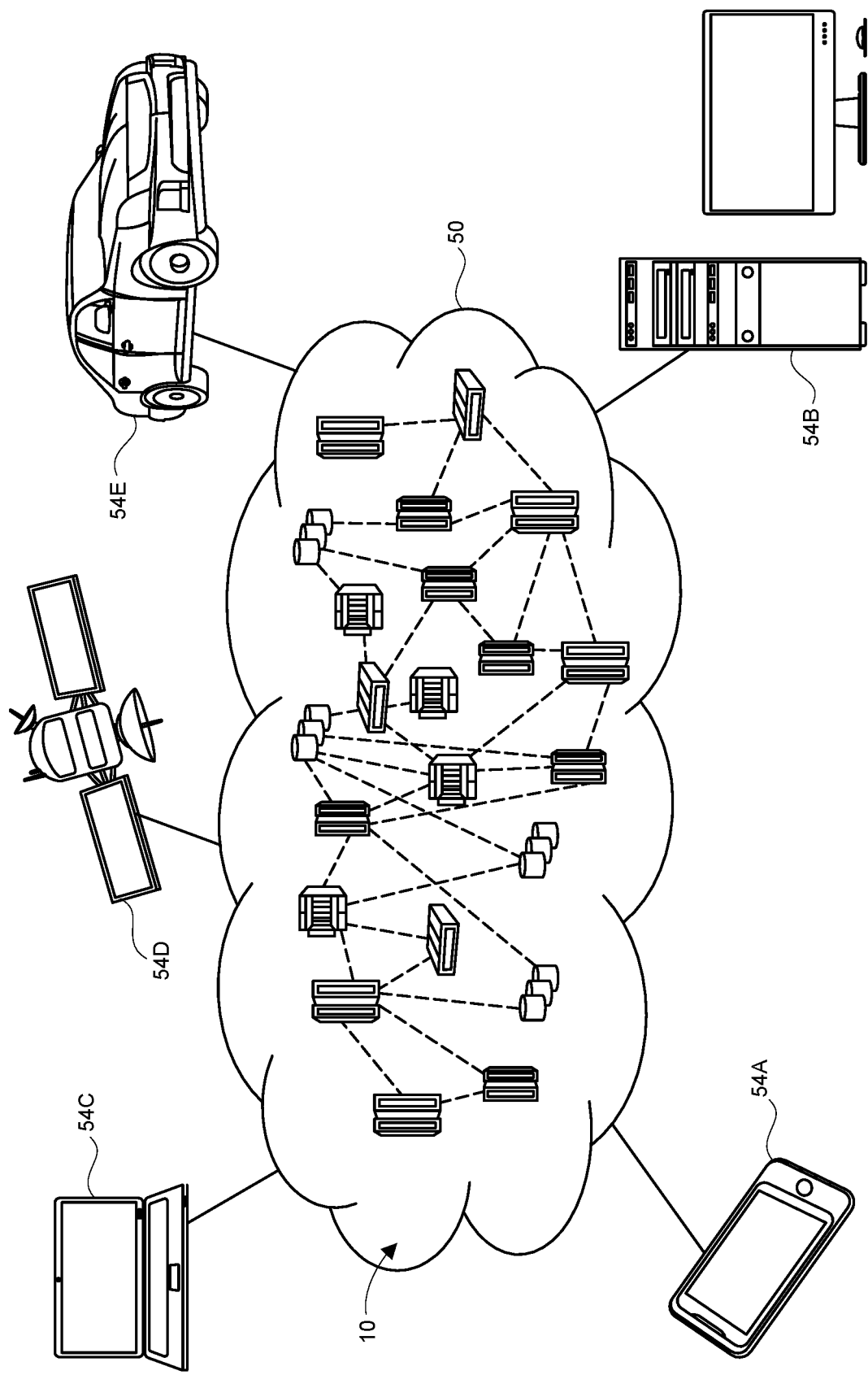
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, mobile device (e.g., cellular telephone or wearable device) 54A, desktop computer 54B, laptop computer 54C, satellites (e.g., GPS satellites) 54D, and vehicles (e.g., automobiles, aircraft, watercraft, etc.) 54E, may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-E shown in FIG. 2 are intended to be illustrative only and that computing nodes 10 and cloud computing environment 50 can communicate with any type of computerized device over any type of network and/or network addressable connection (e.g., using a web browser).

Figure 3:
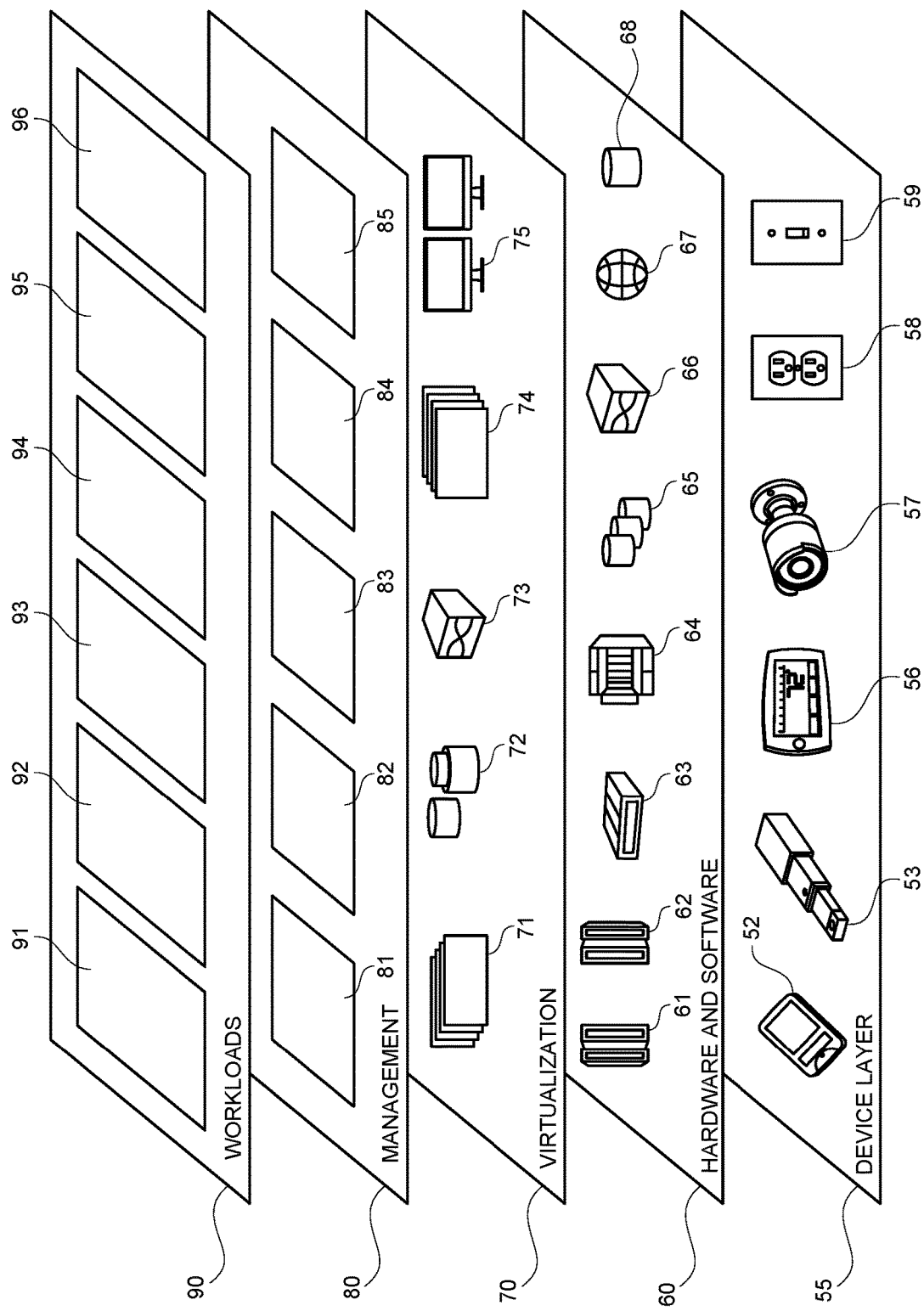
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to mobile devices, computing systems within vehicles (e.g., automobiles, aircraft, watercraft, etc.), and satellites (e.g., GPS satellites), and various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for determining (or creating) routes as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for determining routes, or more particularly, routes with shared portions. A first set of route parameters and a second set of route parameters, each of which is associated with a respective entity or route, are received. At least one of the first set of route parameters and the second set of route parameters includes a route sharing parameter. A first route and a second route are determined based on the first set of route parameters and the second set of route parameters. The first route includes a first shared portion, and the second route comprises a second shared portion. The first shared portion of the first route is within a predetermined distance of the second shared portion of the second route based on the route sharing parameter.

Each of the sets of route sharing parameters may (also) include a starting point, a finishing point, a route distance, and route time. The starting point and the finishing point may correspond to the same location for at least one of the first route and the second route.

The route sharing parameter may include maximizing the length of the first shared portion of the first route and the second shared portion of the second route (e.g., maximizing the portions of the routes that overlap while still maintaining the other route parameters). As another example, the route sharing parameter may include a selected length of the first shared portion of the first route and the second shared portion of the second route (e.g., a set/desired length of the portions of the routes that overlap).

An indication of a meeting time associated with at least one of a first user associated with the first route and a second user associated with the second route may be generated. The generating of the indication may be performed using, for example, a mobile electronic device.

The methods and systems described herein may include a data collection aspect, in which a variety of information may be collected about entities (e.g., users, mobile devices, vehicles, etc.) for which the routes are being created. For example, in some embodiments, a set of route parameters associated with each entity (and/or route) is received. The route parameters may include, for example, a starting point (or initial location), a finishing point (or destination), a route distance, a route/travel time, starting time, ending time, speed, power characteristics (e.g., for mobile devices), a map associated with a particular area, a spatio-temporal window (i.e., a preference regarding entity location and time along the route), a maximum distance away from a reference point (e.g., the starting point), and/or any other parameter that may be related to a route taken by an entity. In some embodiments, at least some of the route parameters are ranges (e.g., a route distance of between 8 miles and 10 miles), as opposed to specific, particular values. In this manner, each of the sets of route parameters may be considered to provide a "budget" for a respective route.

In some embodiments, at least one of the sets of route sharing parameters (also) includes a route sharing parameter that indicates a setting or preference with respect to the extent of overlap or "sharing" between the determined routes. For example, in some embodiments, the route sharing parameter includes a preference to maximize the extent to which the routes of the different entities are shared such that the different entities travel together (or at least within a predetermined distance of each other) for as long as possible (e.g., with respect to distance and/or time) while, for example, still maintaining (or obeying or complying with) the other route parameters associated with each entity. As another example, the route sharing parameter may include a preference for (or selection of) a length of the shared or overlapping portion(s) of the routes (e.g., distance and/or time). For instance, if the entities (or users) are runners or cyclists, the route sharing parameter may be set such that the routes overlap for a specified distance (e.g., one mile) or time (e.g., 10 minutes), as opposed to maximizing the shared portion(s) of the routes. Also, the route sharing parameters may include a preference for beginning point and ending point for the shared portions of the routes (e.g., a meeting point and a break up point).

The route parameters may be received (or collected) in any suitable manner, such as by being manually entered (e.g., via text commands, voice commands, etc.) on a computing device, such as a mobile or wearable device (e.g., a wearable device suitable for exercise/training programs) or a computing system associated with a vehicle. In some embodiments, at least some of the route parameters may be saved as settings, either selected by a user or system defaults, which may repeatedly be used for determining multiple routes (e.g., unless/until changed by a user).

Additional information that may be used includes, for example, the current date/season and weather data (e.g., temperature, chance of participation, etc.) associated with the region(s) the routes traverse. Further, the information may include any other information that is deemed to be related to or associated with the particular entities travelling through particular areas (e.g., air or ground activity, path/roadway construction, geopolitical circumstances, etc.).

Figure 4:
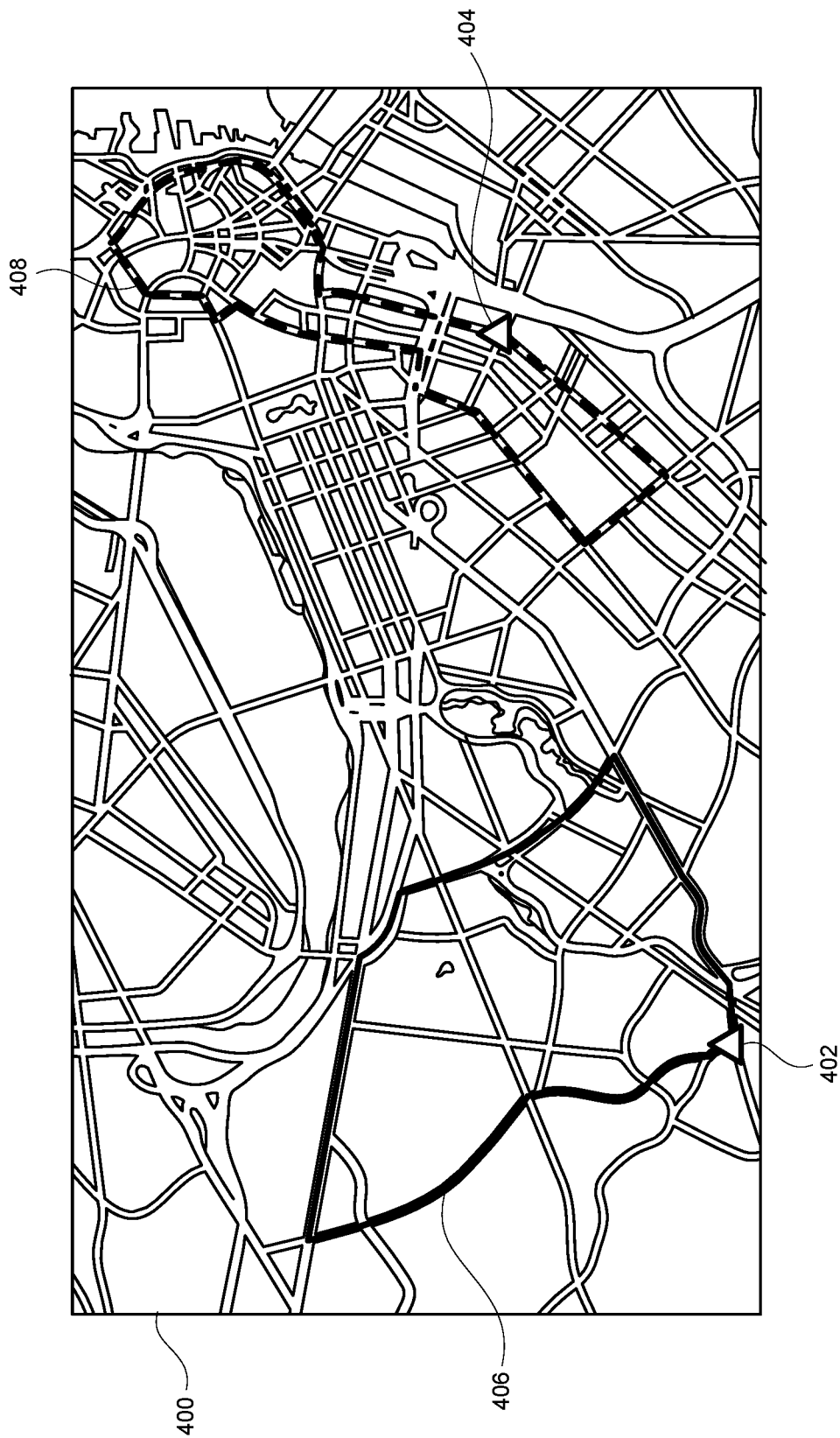
FIG. 4 is a plan view of a map of a region having separate routes displayed thereon.

Referring to FIG. 4, a map 400 of an exemplary region is shown. In the depicted embodiment, the region includes various roadways and other features that indicate the region is relatively large (e.g., miles across). However, it should be understood that in other embodiments, the region may be considerably smaller (e.g., dozens of feet or yards across). It should also be understood that the map 400 may be displayed on an electronic device, such as a cellular phone, PDA, tablet, or computer system in a vehicle, such as an automobile, aircraft, or watercraft. However, the map 400 may also be used simply to illustrate aspects of functionality in accordance with some embodiments described herein.

On the map 400, the initial locations (or starting points) 402 and 404 associated with respective entities, such as runners, walkers, cyclists, etc., are shown. The exact locations of the starting points 402 and 404 may be received during the data collection aspect described above, along with various other route parameters, also described above. In the particular example shown in FIG. 4, exemplary routes 406 and 408, respectively associated with starting point 402 and starting point 404 (and/or the associated users), have been generated (and displayed). It should be noted that as shown, routes 406 and 408 shown in FIG. 4 do not overlap and/or include any shared portions. As such, it should be understood that routes 406 and 408 are intended to illustrate exemplary routes that may be generated utilizing respective sets of route parameters (as well as the other information described above) which do not include a route sharing parameter. Rather, routes 406 and 408 may be generated based on route parameters including, for example, a starting point, an ending point (e.g., the same as the starting point), route distance, etc. In other words, route 406 and 408 may each be generated based on the respective sets of route sharing parameters, as opposed to also taking into consideration a route sharing parameter and/or the route parameters associated with another route and/or user. In some embodiments described herein, such route generating (i.e., non-sharing routes) may be selectively implemented (e.g., by deactivating the route sharing functionality and/or not including a route sharing parameter in the sets of route parameters).

Figure 5:
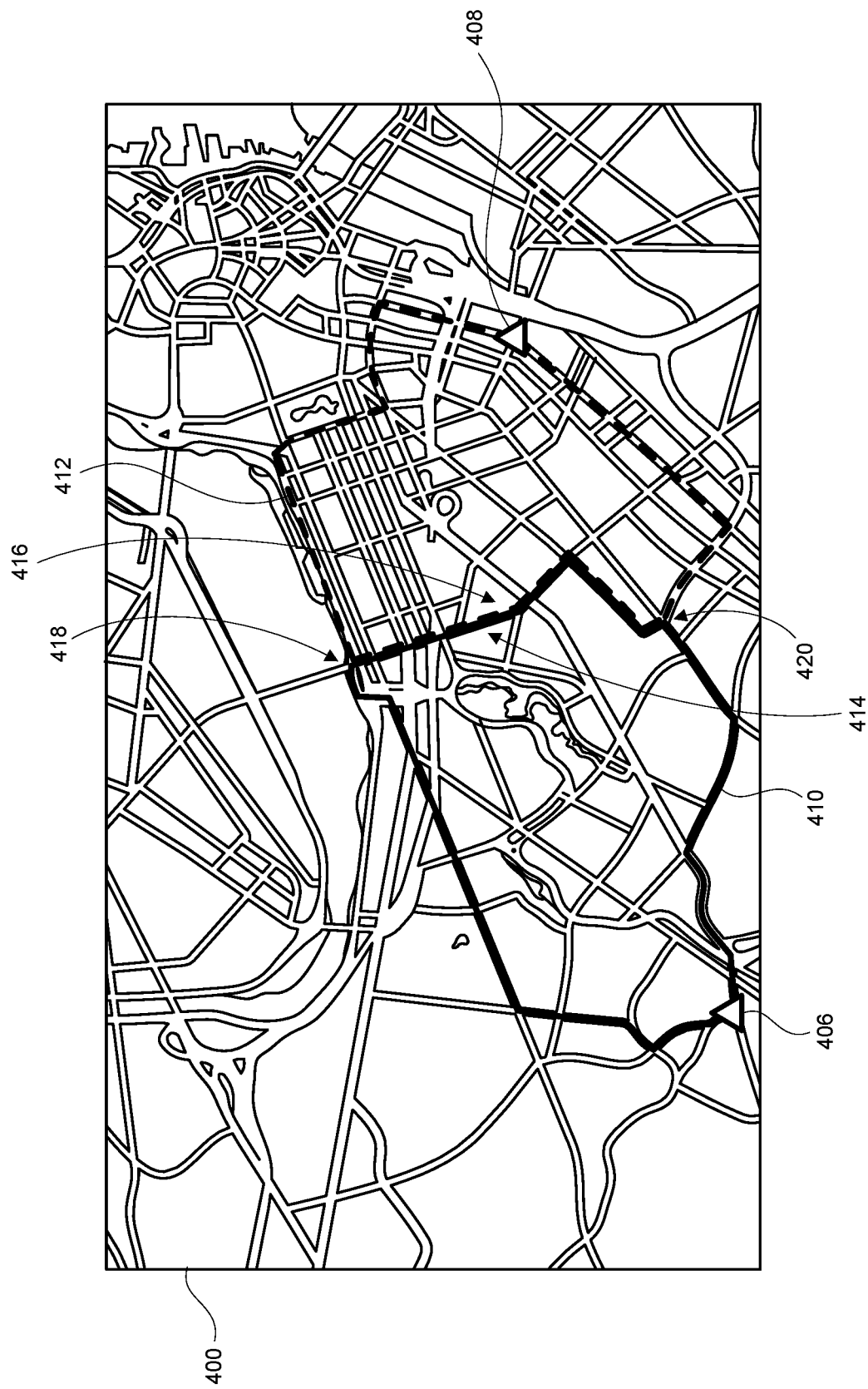
FIG. 5 is a plan view of the map of FIG. 4 having routes with at least one shared portion displayed thereon.

Referring now to FIG. 5, "shared" routes 410 and 412 have been generated (and displayed on map 400) using the same sets of route parameters with the addition of one or more route sharing parameters. As such, the overall shapes of the routes 410 and 412 are different than routes 406 and 408 shown in FIG. 4, and route 410 includes a (first) shared portion 414 and route 412 includes a (second) shared portion 416. However, it should be understood that both route 410 and 412 may still be formed using (i.e., in compliance with) the other route parameters used to generate routes 406 and 408 shown in FIG. 4 (e.g., starting point, ending point, route distance, etc.). That is, although routes 410 and 412 are noticeably different than routes 406 and 408, respectively, routes 410 and 412 fall within the "budgets" provided by the sets of route parameters used to form routes 406 and 408.

In some embodiments, the shared routes 410 and 412 are sequentially determined (or generated). For example, route 410 may first be determined utilizing the route parameters only (directly) associated therewith (e.g., the first set of route parameters), perhaps excluding the route sharing parameter. Route 412 may then be determined utilizing its associated route parameters, including the route sharing parameter, combined with the layout of the already determined route 410. In some embodiments, such as those in which the sharing/overlapping of routes is maximized, during the determining of the routes, back-tracking and exploring using, for example, a depth-first search (DFS) method may be implemented to optimize route sharing. Although only two routes 410 and 412 are shown in FIG. 5, it should be understood that in some embodiments, a greater number of routes (e.g., three or more), associated with additional entities, may be formed in the same manner (i.e., with portions that overlap the other routes).

As described above, the route sharing parameter may include a preference to form the routes such that the length of the shared portions of the routes (and/or the time spent on the shared portions of the routes by the respective entities) is maximized (i.e., while still complying with the other route parameters). In some embodiments, the shared portions 414 and 416 of the routes 410 and 412 overlap (i.e., during those portions of the routes, the routes respective users/entities will be identical). However, in other embodiments, the shared portions 414 and 416 of the routes 410 and 412 are merely within a predetermined distance of each other (e.g., several meters).

As is evident in FIG. 5, if the user associated with route 410 travels route 410 in a clockwise manner (as viewed in FIG. 5) and the user associated with route 412 travels route 412 in a counterclockwise manner, the paths taken by the users will overlap (or be within a predetermined distance of each other) at point 418, which may be considered a meeting (or rendezvous) point. Likewise, the paths taken by the users will diverge at point 420, which may be considered to be a break up (or departure) point. In the event that the users travel the respective routes 410 and 412 in the opposite directions, the meeting point and break up may be reversed. Although not shown in FIG. 5, a suggested direction of travel for the users (or entities) along their respective routes may be indicated to the user(s).

In some embodiments, after the shared routes 410 and 412 are generated, the users are provided with indications (e.g., via electronic message received through a mobile device) of suggested times to meet other users (e.g., at point 418). Similarly, the users may be provided with suggested times for leaving the respective starting points 406 and 408 (e.g., based on speed, route distance, etc.) in order to meet the other user(s) at the meeting point(s), such that, for example, the users arrive at the meeting point at, or about, the same time. In this manner, a spatio-temporal window (i.e., with respect to the location of the users at a particular time) may be provided by the routes 410 and 412 and/or suggested departure and/or meeting times (and/or the spatio-temporal window may be defined by the route parameters associated with each of the users).

In some embodiments, indications are provided to the user(s) (e.g., via electronic messages) regarding their current location along the route and/or the locations of other users regarding their current locations along other routes. For example, in the event that one of the users arrives at a meeting point early, he/she may be provided with an indication of such and/or an estimated time of arrival for the other user(s). Similarly, if one of the users is detected as being ahead of (or behind) schedule along the associated route, the user may be provided with an indication suggesting that he/she adjust his/her speed.

Figure 6:
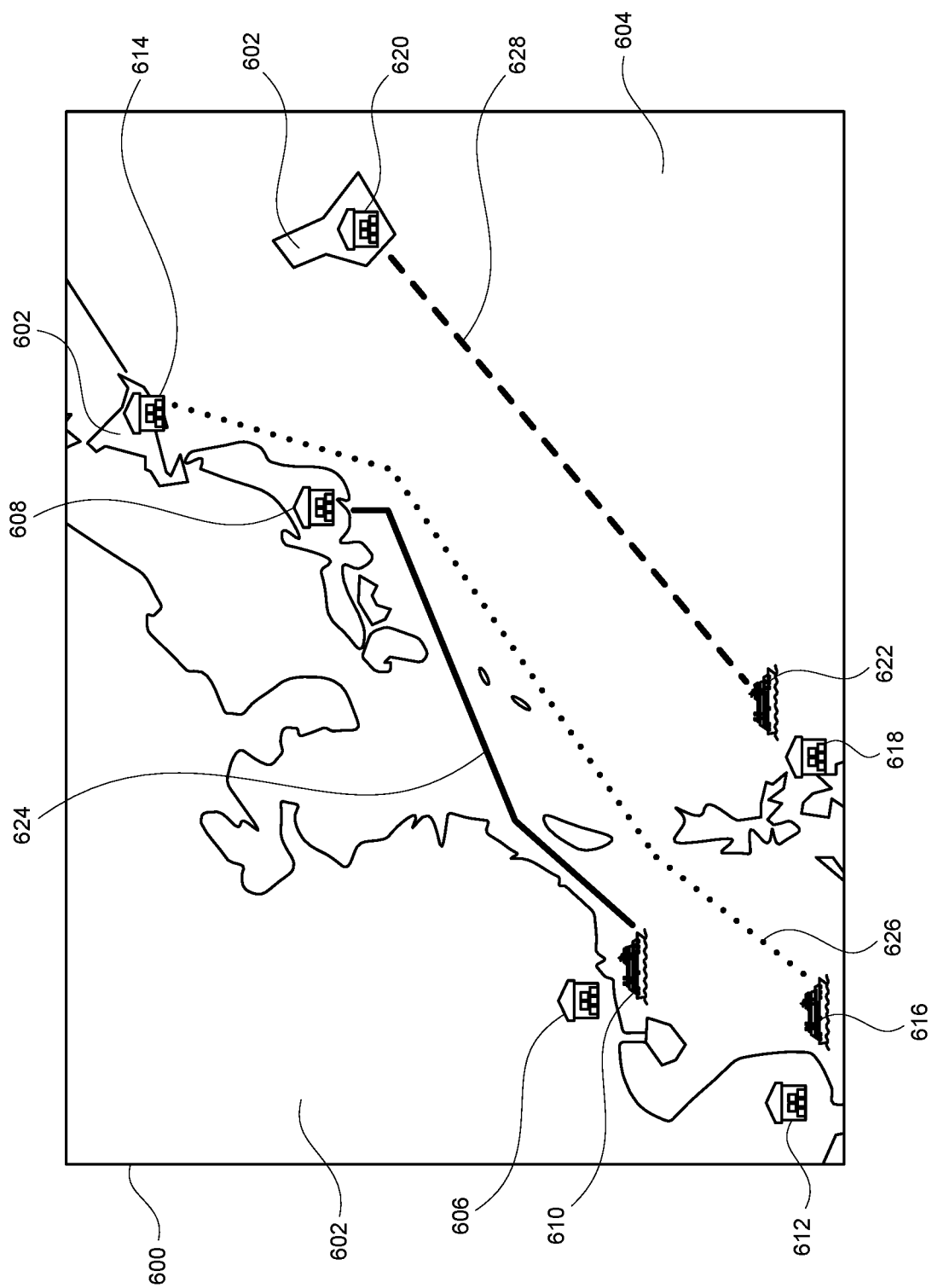
FIG. 6 is a plan view of a map of a region having separate routes displayed thereon.

Referring to FIG. 6, a map 600 of an exemplary region is shown. In the depicted embodiment, the region includes several landmasses 602 and a body of water 604. As with FIGS. 4 and 5, it should be understood that the map 600 may be displayed on an electronic device, such as a cellular phone, PDA, tablet, or computer system in a vehicle, such as an automobile, aircraft, or watercraft. However, the map 600 may also be used simply to illustrate aspects of functionality in accordance with some embodiments described herein.

On the map 600, the initial locations (or starting points) and destinations associated with several vessels (e.g., cargo/container ships) are shown. In particular, starting point 606 and destination 608 are associated with vessel 610, starting point 612 and destination 614 are associated with vessel 616, and starting point 618 and destination 620 are associated with vessel 622.

Still referring to FIG. 6, exemplary routes 624, 626, and 628, respectively associated with vessels 610, 616, and 622 (and/or the corresponding starting points and destinations) have been generated (and displayed). It should be noted that routes 624, 626, and 628 shown in FIG. 6 do not overlap and/or include any shared portions. As such, it should be understood that routes 624, 626, and 628 are intended to illustrate exemplary routes that may be generated utilizing respective sets of route parameters which do not include a route sharing parameter. Rather, routes 624, 626, and 628 may be generated based on route parameters associated with the voyages of vessels 610, 616, and 622 from their respective starting points to their respective destinations, including, for example, a starting point, destination, route distance, etc., along with any other pertinent information (e.g., weather conditions), as described above. In other words, routes 624, 626, and 628 may each be generated based on the route parameters only associated with the respective vessel, as opposed to also taking into consideration a route sharing parameter and/or the route parameters associated with the other vessels. As described above, in some embodiments described herein, such route generating (i.e., non-sharing routes) may be selectively implemented (e.g., by deactivating the route sharing functionality and/or not including a route sharing parameter in the sets of route parameters). As such, in the example shown in FIG. 6, routes 624, 626, and 628 may be relatively "direct" routes between the respective starting point and destination. This is particularly evident with route 628 for vessel 622, which is essentially a straight line between starting point 618 and destination 620.

Figure 7:
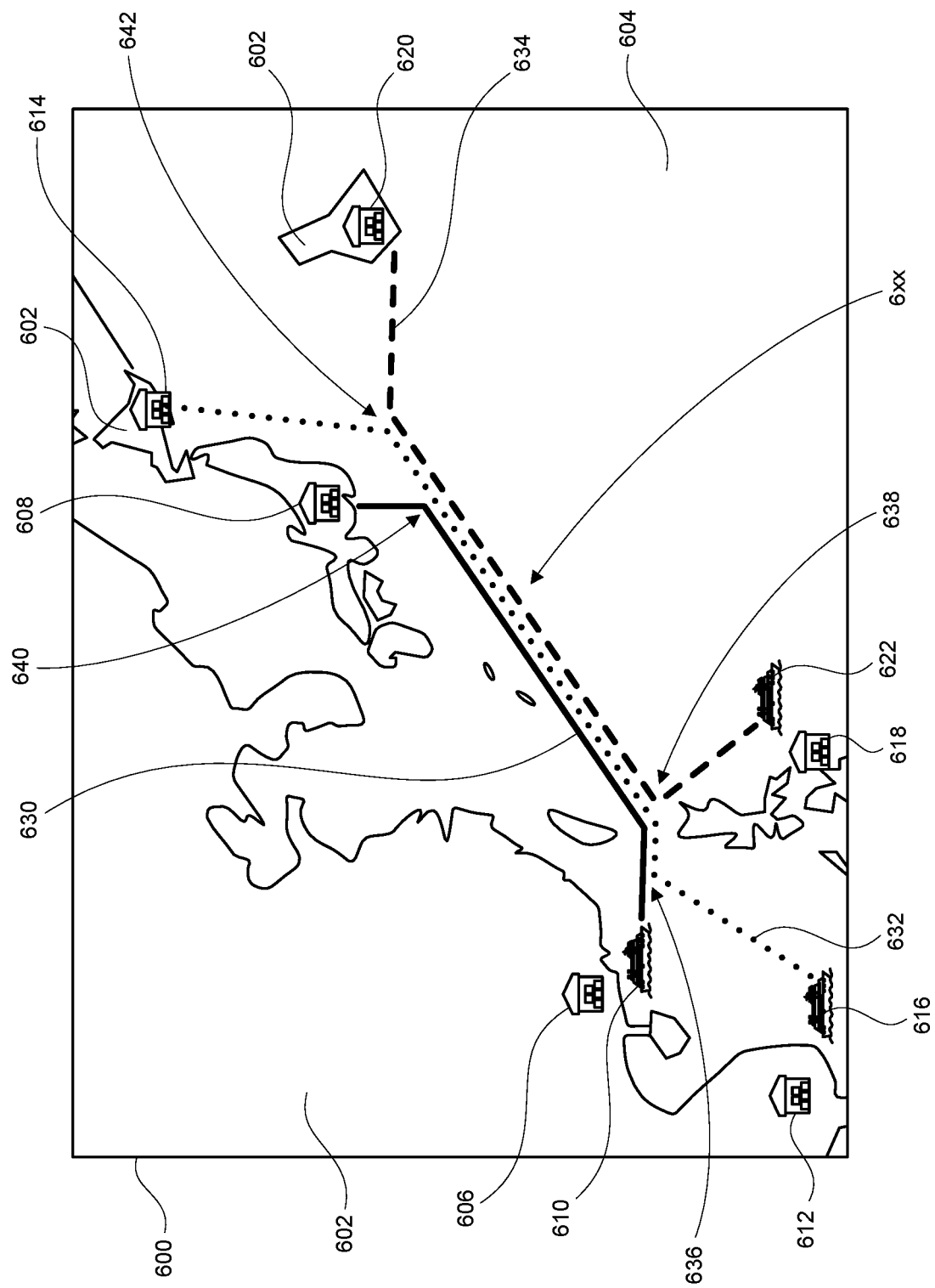
FIG. 7 is a plan view of the map of FIG. 6 having routes with at least one shared portion displayed thereon.

Referring now to FIG. 7, "shared" routes 630, 632, and 634, respectively associated with vessels 610, 616, and 622, have been generated (and displayed) using the same sets of route parameters with the addition of one or more route sharing parameters. As such, the overall shapes of the routes 630, 632, and 634 are different than routes 624, 626, and 628 shown in FIG. 6. However, it should be understood that routes 630, 632, and 634 may still be formed using (i.e., in compliance with) the other route parameters used to generate routes 624, 626, and 628 shown in FIG. 6 (e.g., starting point, ending point, route distance, etc.). As such, although each of routes 630, 632, and 634 is longer than the associated route 624, 626, or 628 shown in FIG. 6, it still falls within the "budget" provided by the respective set of route parameters.

As with the routes shown in FIG. 5, routes 630, 632, and 634 in FIG. 7 include shared portions formed between various meeting points and break up points. As described above, the departure of the vessels 610, 616, and 622 from their respective starting points may be timed or coordinated so that the vessels arrive at the meetings points at the same time (or about the same time). In particular, routes 630, 632, and 634 are arranged so that vessel 610 and vessel 616 may meet at meeting point 636 and travel together, or at least within a predetermined distance of each other, along shared portions of their routes 630 and 632 to meeting point 638, where they may be joined by vessel 622. From meeting point 638, all three vessels may travel along shared portions of their respective route to break up point 640, where vessel 610 may break away from vessel 616 and vessel 622 and travel towards destination 608, while vessel 616 and vessel 622 continue to travel together. At break up point 642, vessel 616 and vessel 622 may break away from one another, with vessel 616 continuing towards destination 614 and vessel 622 continuing towards destination 620.

In this manner, vessels 610, 616, and 622 may be able to travel together, or at least with one other vessel, on their respective voyages for as long as possible (e.g., for safety and/or security reasons) while still complying with their respective sets of route parameters.

Turning to FIG. 8, a flowchart diagram of an exemplary method 800 for determining (or generating) routes, in which aspects of the present invention may be implemented, is illustrated. Method 800 begins (step 802) with, for example, one or more computing devices, which may or may not be directly associated with the routes to be determined, being activated. Exemplary computing devices include mobile devices such as mobile (or cellular and/or smart) phones, PDAs, tablets, wearable technology devices, laptops, handheld game consoles, portable media players, etc., as well as computing systems in vehicles, such as automobiles, aircraft, watercrafts, drones, etc.

A first set of route parameters is received (step 804), and a second set of route parameters is received (step 806). Each of the sets of route parameters may be associated with a route that is to be determined and/or an entity (e.g., a user, computing device, or vehicle) that is to travel along the determined route. In some embodiments, at least one of the first set of route parameters and the second set of route parameters includes, for example, a starting point (or initial location), a finishing point (or destination) (which may correspond to the same location as the starting point), a route distance, a route/travel time, time of day, starting time, ending time, speed, power characteristics (e.g., for mobile devices), a map associated with a particular area, a spatio-temporal window (i.e., a preference regarding entity location and time along the route), a maximum distance away from a reference point (e.g., the starting point), and/or any other parameter that may be related to a route taken by an entity. In some embodiments, at least some of the route parameters are ranges, as opposed to specific, particular values.

In some embodiments, at least one of the sets of route sharing parameters (also) include a route sharing parameter that indicates a setting or preference with respect to the extent of overlap between the determined routes. For example, in some embodiments, the route sharing parameter includes a preference to maximize the "sharing" of routes by the different entities such that the different entities travel together (or at least within a predetermined distance of each other) for as long as possible (e.g., with respect to distance and/or time) while, for example, still maintaining (or obeying or complying with) the other route parameters. As another example, the route sharing parameter may include a preference for (or selection of) a length of the shared or overlapping portion(s) of the routes (e.g., distance and/or time). For instance, if the entities (or users) are runners or cyclists, the route sharing parameter may be set such that the routes overlap for a specified distance (e.g., one mile) or time (e.g., 10 minutes), as opposed to maximizing the shared portion(s) of the routes.

The route parameters may be received (or collected) in any suitable manner, such as by being manually entered (e.g., via text commands, voice commands, etc.) on a computing device, such as a mobile or wearable device (e.g., a wearable device suitable for exercise/training programs). In some embodiments, at least some of the route parameters are saved as settings, either selected by a user or system defaults, which may repeatedly be used for determining multiple routes (e.g., unless/until changed by a user).

A first route and a second route are determined based on the first set of route parameters and the second set of route parameters (step 808). In at least some embodiments, the first route comprises a first shared portion and the second route comprises a second shared portion. The first shared portion of the first route may overlap, or at least be within a predetermined distance of, the second shared portion of the second route based on the route sharing parameter.

Method 800 ends (step 810) with, for example, indications of the determined routes being generated. For example, the determined routes may be displayed (or rendered) on computing devices (e.g., mobile devices, computing systems on vehicles, etc.). In some embodiments, an indication of a meeting time associated with at least one of a first user (or entity) associated with the first route and a second user associated with the second route is generated (e.g., by a computing device, such as a mobile electronic device, associated with at least one of the users).

It should be understood that method 800 is intended to provide a simplified embodiment of the methods described herein. For example, in other embodiments, additional sets of route parameters are received, and additional routes are determined (e.g., more than two routes having shared portions may be determined and/or routes for more than two entities may be determined).

Further, it should be understood that the examples described above (e.g., routes used by athletes and cargo ships) are merely intended as two possible implementations of the methods and systems described herein, as the route sharing functionality may be applied to any situation in which it may be deemed to be beneficial for travelling entities to use common routes. As another example, for safety/security reasons, it may be beneficial for security personnel (and/or vehicles) patrolling adjacent areas to share routes to the extent that it's possible considering the requirements of the duties (e.g., size of patrol area, etc.).

As yet a further example, the route sharing functionality described herein may be beneficial to entities that desire to maintain privacy with respect to their location at any particular time (e.g., GPS data associated with a mobile device). That is, the route sharing functionality described herein may provide users with a manner for his/her particular movements and/or travelling tendencies, such as those detected with respect to the use of a mobile device, to be "blended in with" and/or "camouflaged" by those of other users.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for determining routes, comprising:
   receiving a first set of route parameters;
   receiving a second set of route parameters, wherein at least one of the first set of route parameters and the second set of route parameters comprises a route sharing parameter and a value of a total route distance at least one of a first user associated with a first route and a second user associated with a second route is willing to travel on at least one of the first route and the second route;
   automatically determining the first route and the second route based on the first set of route parameters and the second set of route parameters, wherein the first route comprises a first shared portion and the second route comprises a second shared portion, and the first shared portion of the first route is within a predetermined distance of the second shared portion of the second route based on the route sharing parameter, and wherein the route sharing parameter includes maximizing a length of the first shared portion of the first route and the second shared portion of the second route notwithstanding each of the first set of route parameters and the second set of route parameters are complied with prior to implementing the route sharing parameter in the determining;
   in accordance with the determining of the first route and the second route, sequentially generating the first shared portion and the second shared portion utilizing a depth-first search (DFS) algorithm to explore and back-track data structures representing the first route and the second route; wherein the DFS algorithm is implemented to incorporate the route sharing parameter of maximizing the length of the first shared portion and the second shared portion; and
   generating an indication, displayed on a mobile electronic device, of a meeting time at least one of the first user associated with the first route is to meet the second user associated with the second route according to the determination of the first route and the second route based on the route sharing parameter of the first set of route parameters and the second set of route parameters.

2. The method of claim 1, wherein at least one of the first set of route parameters and the second set of route parameters further includes at least one of a starting point, a finishing point, and route time.

3. The method of claim 2, wherein the starting point and the finishing point correspond to the same location for at least one of the first route and the second route.

4. The method of claim 1, wherein the route sharing parameter further includes a constraint on the length of the first shared portion of the first route and the second shared portion of the second route.

5. A system for determining routes, comprising:
at least one processor configured to
receive a first set of route parameters;
receive a second set of route parameters, wherein at least one of the first set of route parameters and the second set of route parameters comprises a route sharing parameter and a value of a total route distance at least one of a first user associated with a first route and a second user associated with a second route is willing to travel on at least one of the first route and the second route;
automatically determine the first route and the second route based on the first set of route parameters and the second set of route parameters, wherein the first route comprises a first shared portion and the second route comprises a second shared portion, and the first shared portion of the first route is within a predetermined distance of the second shared portion of the second route based on the route sharing parameter, and wherein the route sharing parameter includes maximizing a length of the first shared portion of the first route and the second shared portion of the second route notwithstanding each of the first set of route parameters and the second set of route parameters are complied with prior to implementing the route sharing parameter in the determining;
in accordance with the determining of the first route and the second route, sequentially generate the first shared portion and the second shared portion utilizing a depth-first search (DFS) algorithm to explore and back-track data structures representing the first route and the second route; wherein the DFS algorithm is implemented to incorporate the route sharing parameter of maximizing the length of the first shared portion and the second shared portion; and
generate an indication, displayed on a mobile electronic device, of a meeting time the first user associated with the first route is to meet the second user associated with the second route according to the determination of the first route and the second route based on the route sharing parameter of the first set of route parameters and the second set of route parameters.

6. The system of claim 5, wherein at least one of the first set of route parameters and the second set of route parameters further includes at least one of a starting point, a finishing point, and route time.

7. The system of claim 6, wherein the starting point and the finishing point correspond to the same location for at least one of the first route and the second route.

8. The system of claim 5, wherein the route sharing parameter further includes a constraint on the length of the first shared portion of the first route and the second shared portion of the second route.

9. A computer program product for determining routes by one or more processors, the computer program product comprising a non-transitory computer-readable storage medium having computer-readable program code portions stored therein, the computer-readable program code portions comprising:
an executable portion configured to receive a first set of route parameters;
an executable portion configured to receive a second set of route parameters, wherein at least one of the first set of route parameters and the second set of route parameters comprises a route sharing parameter and a value of a total route distance at least one of a first user associated with a first route and a second user associated with a second route is willing to travel on at least one of the first route and the second route;
an executable portion configured to automatically determine the first route and the second route based on the first set of route parameters and the second set of route parameters, wherein the first route comprises a first shared portion and the second route comprises a second shared portion, and the first shared portion of the first route is within a predetermined distance of the second shared portion of the second route based on the route sharing parameter, and wherein the route sharing parameter includes maximizing a length of the first shared portion of the first route and the second shared portion of the second route notwithstanding each of the first set of route parameters and the second set of route parameters are complied with prior to implementing the route sharing parameter in the determining;
an executable portion that configured to, in accordance with the determining of the first route and the second route, sequentially generate the first shared portion and the second shared portion utilizing a depth-first search (DFS) algorithm to explore and back-track data structures representing the first route and the second route; wherein the DFS algorithm is implemented to incorporate the route sharing parameter of maximizing the length of the first shared portion and the second shared portion; and
an executable portion that configured to generate an indication, displayed on a mobile electronic device, of a meeting time the first user associated with the first route is to meet the second user associated with the second route according to determination of the first route and the second route based on the route sharing parameter of the first set of route parameters and the second set of route parameters.

10. The computer program product of claim 9, wherein at least one of the first set of route parameters and the second set of route parameters further includes at least one of a starting point, a finishing point, and route time.

11. The computer program product of claim 10, wherein the starting point and the finishing point correspond to the same location for at least one of the first route and the second route.

12. The computer program product of claim 9, wherein the route sharing parameter further includes a constraint on the length of the first shared portion of the first route and the second shared portion of the second route.

* * * * *